US008477811B2

(12) United States Patent
Kitazoe (10) Patent No.: US 8,477,811 B2
(45) Date of Patent: Jul. 2, 2013

(54) RADIO ACCESS NETWORK (RAN) LEVEL KEEP ALIVE SIGNALING

(75) Inventor: Masato Kitazoe, Tokyo (JP)

(73) Assignee: Qualcomm Incorporated, San Diego, CA (US)

( * ) Notice: Subject to any disclaimer, the term of this patent is extended or adjusted under 35 U.S.C. 154(b) by 756 days.

(21) Appl. No.: 12/362,987

(22) Filed: Jan. 30, 2009

(65) Prior Publication Data

US 2009/0197589 A1    Aug. 6, 2009

Related U.S. Application Data

(60) Provisional application No. 61/025,770, filed on Feb. 2, 2008.

(51) Int. Cl.
*H04J 3/06* (2006.01)
*H04L 12/26* (2006.01)

(52) U.S. Cl.
USPC ............................ 370/503; 370/231; 370/236

(58) Field of Classification Search
USPC ........... 370/503–514; 455/502–503; 375/354, 375/356
See application file for complete search history.

(56) References Cited

U.S. PATENT DOCUMENTS

| | | | |
|---|---|---|---|
| 4,860,292 A | 8/1989 | Newman et al. | |
| 6,058,106 A | 5/2000 | Cudak et al. | |
| 6,229,807 B1 | 5/2001 | Bauchot et al. | |
| 6,253,091 B1 | 6/2001 | Naddell et al. | |
| 6,377,560 B1 | 4/2002 | Dailey | |
| 2001/0031634 A1 | 10/2001 | Mizutani et al. | |
| 2003/0171112 A1 | 9/2003 | Lupper et al. | |
| 2007/0077960 A1 | 4/2007 | Jain | |
| 2007/0297609 A1 | 12/2007 | Adams et al. | |
| 2008/0220796 A1 | 9/2008 | Kohlmann et al. | |

(Continued)

FOREIGN PATENT DOCUMENTS

| | | |
|---|---|---|
| CN | 1422507 A | 6/2003 |
| JP | 7003973 B | 1/1995 |

(Continued)

OTHER PUBLICATIONS

TS 25.331 V8.5.0 (Dec. 2008) 3rd Generation Partnership Project; Technical Specification Group Radio Access Network; Radio Resource Control (RRC); Protocol Specification (Release 8), Section 8.3.1, pp. 189-229.

(Continued)

*Primary Examiner* — Thai Hoang
(74) *Attorney, Agent, or Firm* — Kam T. Tam (57) ABSTRACT

In a wireless communication system, a mobile station performs "keep-alive" signaling with a serving radio access network (RAN), transmitting its identity without necessarily an accompanying data portion. The serving RAN does not necessarily acknowledge. Thereby, the mobile station maintains state synchronization with the serving RAN, which also benefits in being able to timely release a context when the "keep-alive" transmission is not continued. In one aspect, the mobile station utilizes random access procedures (RACH) for uplink data arrival with a 0-byte MAC buffer status report whose identifying Cell Radio Network Temporary Identity (C-RNTI) can be used by the serving RAN for keep alive purposes. In another aspect, the mobile station can perform non-access stratum (NAS) signaling containing identification for the mobile station that is supported by underlying access stratum (AS) signaling via the serving RAN. This identifying NAS signaling is detected or a downstream recipient alerts the serving RAN.

23 Claims, 8 Drawing Sheets

U.S. PATENT DOCUMENTS

| | | | | |
|---|---|---|---|---|
| 2008/0225865 A1* | 9/2008 | Herzog | | 370/401 |
| 2008/0232321 A1* | 9/2008 | Tiirola et al. | | 370/329 |
| 2009/0003208 A1 | 1/2009 | Payyappilly et al. | | |
| 2009/0092077 A1* | 4/2009 | Pirskanen et al. | | 370/328 |
| 2009/0180414 A1* | 7/2009 | Maeda et al. | | 370/311 |
| 2009/0201864 A1* | 8/2009 | Ahluwalia | | 370/329 |
| 2010/0002590 A1* | 1/2010 | Park et al. | | 370/241 |
| 2010/0118798 A1* | 5/2010 | Chun et al. | | 370/329 |
| 2010/0226267 A1* | 9/2010 | Jang et al. | | 370/252 |
| 2011/0019604 A1* | 1/2011 | Chun et al. | | 370/312 |
| 2011/0047429 A1* | 2/2011 | Kashima et al. | | 714/748 |
| 2011/0211516 A1* | 9/2011 | Yi et al. | | 370/312 |

FOREIGN PATENT DOCUMENTS

| | | | |
|---|---|---|---|
| JP | 2002010341 A | 1/2002 | |
| JP | 2003502913 A | 1/2003 | |
| JP | 2005535272 A | 11/2005 | |
| JP | 2006186602 A | 7/2006 | |
| JP | 2007505523 A | 3/2007 | |
| RU | 2295841 C2 | 3/2007 | |
| RU | 2313198 C2 | 12/2007 | |
| TW | 200402978 | 2/2004 | |
| WO | WO2005027068 A1 | 3/2005 | |
| WO | WO2007038804 | 4/2007 | |

OTHER PUBLICATIONS

3rd Generation Partnership Project, Technical Specification Group Radio Access Network: "Evolved Universal Terrestrial Radio Access (E-UTRA) Medium Access Control (MAC) protocol Specification (Release 8)" 3GPP TS 36.321 V8.0.0, Dec. 1, 2007 XP002525660 p. 17, paragraph 5.4.5 p. 20, paragraph 6.1.3.1.

3rd Generation partnership project; Technical Specification Group Core Network Architecture and Terminals: "3GPP System Architecture Evolution; CT WG1 Aspects (Release 8)" 3GPP TR 24.801 V0.5.1, Dec. 1, 2007, XP002525661 p. 18, paragraph 5.2.5.3-p. 21, paragraph 6.2.1.2 p. 30, paragraph 6.2.5.3-p. 32, paragraph 6.2.5.3.4.

"3rd Generation partnership project; Technical Specification Group GERAN, Enhanced Generic Access Networks study (EGAN); (Release 8)" 3GPP Draft; GP-070548, 3rd Generation Partnership Project (3GPP), Mobile Competence Centre: 650, Route Des Lucioles; F-06921 Sophia-Antipolis Cedex; France, no.St. Louis, Missouri; Feb. 12, 2007, Feb. 15, 2007,XP050160937 p. 77 paragraph 5.2.5.4.4.

International Search Report and Written Opinion—PCT/US2009/032817—ISA/EPO—Jun. 10, 2009.

Qualcomm Europe: "RAN level "keep-alive" signalling" 3GPP Draft; R2-081096, 3rd Generation Patnership Project (3GPP), Mobile Competence Centre; 650, Route Des Lucioles ; F-06921 Sophia-Antipolis Cedex; France, no. Sorrento, Italy; Feb. 11, 2008, Feb. 4, 2008, XP050138882 the whole document.

UMTS YY.01 V1.0.3, L23 EG (Editor) : "UE-UTRAN Radio Interface Protocol Architecture; Stage 2", 3GPP Draft R299-011; 3GPP TSG RAN WG2#1: Jan. 20-22, 1999.

Taiwan Search Report—TW098103321—TIPO—Oct. 29, 2012.

* cited by examiner

RADIO ACCESS NETWORK (RAN) LEVEL KEEP ALIVE SIGNALING

RELATED APPLICATIONS

The present Application for Patent claims priority to U.S. Provisional Application No. 61/025,770 entitled "RAN LEVEL 'KEEP ALIVE' SIGNALLING" filed Feb. 2, 2008, which is hereby expressly incorporated by reference in their entirety.

BACKGROUND

1. Field

The present invention is related to mobile phones and in particular context "keep alive" at a radio access network (RAN) serving mobile phones comprising Wideband Code Division Multiple Access (WCDMA).

2. Background

Wireless communication networks are widely deployed to provide various services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

WCDMA (Wideband Code Division Multiple Access) has become a third generation standard for mobile communications. The WCDMA replaces the GSM (Global System for Mobile Communications) a second generation standard, which is oriented to voice communications with limited data capability. The demand by users for not only voice communications but also Web browsing, downloading E-mail, and sending pictures has placed a demand for higher data rate capability. The WCDMA standard provides a spectrum with a 5 MHz carrier, which provides approximately a fifty times higher data rate than the second generation GSM technology. Along with the higher data rate capability come the need to use more power and in turn the need to have power savings to moderate the demand on the battery life of a mobile or cellular phone.

In a wireless network, the presence of the mobile station is maintained by the network in order to appropriately schedule resources and to successfully route and maintain communication sessions. Data received is accompanied by identification for the mobile station (or user equipment) that can assist in maintaining tracking of such presence. Conversely, mobile stations can frequently leave the coverage area of a radio access network (RAN), be turned off for an extended period, or suffer from a fading channel that prevent continued sessions via a serving RAN. Thus, it is advantageous that the RAN be allowed to release resources and to discontinue maintaining presence tracking for such a departing mobile station.

In many instances, a mobile station enters a state when no data communication sessions are active, but state synchronization with the serving RAN is desired. Thereby, future sessions can be readily initiated or the mobile station can more quickly be contacted by another station via the serving RAN. Often such mobile stations enter a power saving state where minimal transmissions should be made (data idle state). However, conventionally a layer 3 message has to be made from the mobile station to the serving RAN in order to "keep alive" the context for the mobile station at the RAN. Typically, layer 3 messages also prompt an acknowledgement from the RAN. Thus, when the mobile station has no data to communicate, such keep alive signaling consumes over the air resources, both the uplink and the downlink.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with "keep alive" signaling at a Radio Access Network (RAN) level for maintaining context for user equipment (UE) for state synchronization.

In one aspect, a method is provided for keep alive signaling to a radio access network (RAN) by determining that no data is queued for transmission to a serving radio access network, and maintaining state synchronization with the serving radio access network by periodically transmitting an identifying signal without accompanying data, prompting maintenance of context.

In another aspect, at least one processor is provided for keep alive signaling to a radio access network (RAN). A first module determines that no data is queued for transmission to a serving radio access network. A second module maintains state synchronization with the serving radio access network by periodically transmitting an identifying signal without accompanying data, prompting maintenance of context.

In an additional aspect, a computer program product is provided for keep alive signaling to a radio access network (RAN). A computer-readable storage medium comprises a first set of codes for causing a computer to determine that no data is queued for transmission to a serving radio access network. A second set of codes causes the computer to maintain state synchronization with the serving radio access network by periodically transmitting an identifying signal without accompanying data, prompting maintenance of context.

In another additional aspect, an apparatus is provided for keep alive signaling to a radio access network (RAN). Means are provided for determining that no data is queued for transmission to a serving radio access network. Means are provided for maintaining state synchronization with the serving radio access network by periodically transmitting an identifying signal without accompanying data, prompting maintenance of context.

In a further aspect, an apparatus is provided for keep alive signaling to a radio access network (RAN). A computing platform determines that no data is queued for transmission to a serving radio access network. A transmitter maintains state synchronization with the serving radio access network by periodically transmitting an identifying signal without accompanying data, prompting maintenance of context.

In yet one aspect, method is provided for receiving keep alive signaling from mobile station at a radio access network (RAN) by periodically receiving an identifying signal without accompanying data from a mobile station, resetting a keep alive timer for the mobile station based upon the identifying signal, and maintaining context for the mobile station.

In yet another aspect, at least one processor is provided for receiving keep alive signaling from mobile station at a radio access network (RAN). A first module periodically receives an identifying signal without accompanying data from a mobile station. A second module resets a keep alive timer for the mobile station based upon the identifying signal. A third module maintains context for the mobile station.

In yet an additional aspect, a computer program product is provided for receiving keep alive signaling from mobile station at a radio access network (RAN). A computer-readable storage medium comprises a first set of codes for causing a computer to periodically receive an identifying signal without accompanying data from a mobile station. A second set of codes causes the computer to reset a keep alive timer for the mobile station based upon the identifying signal. A third set of codes causes the computer to maintain context for the mobile station.

In yet an additional aspect, an apparatus is provided for receiving keep alive signaling from mobile station at a radio access network (RAN). Means are provided for periodically receiving an identifying signal without accompanying data from a mobile station. Means are provided for resetting a keep alive timer for the mobile station based upon the identifying signal. Means are provided for maintaining context for the mobile station.

In yet another additional aspect, an apparatus is provided for receiving keep alive signaling from mobile station at a radio access network (RAN). A receiver periodically receives an identifying signal without accompanying data from a mobile station. A computing platform resets a keep alive timer for the mobile station based upon the identifying signal and maintains context for the mobile station.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

In a wireless communication system such as employing Evolved Universal Terrestrial Radio Access Network (E-UTRAN), a mobile station is capable of performing "keep-alive" signaling with a radio access network (RAN). The mobile station transmits its presence to the serving RAN in an identifying "keep-alive" transmission that lacks an accompanying data portion. The serving RAN need not acknowledge. Thereby, the mobile station maintains state synchronization with the serving RAN, which also benefits in being able to timely release a context for the mobile station when the "keep-alive" transmission is not continued. In one aspect, the mobile station utilizes random access procedures (RACH) for uplink data arrival with a 0-byte Medium Access Control (MAC) buffer status report whose identifying Cell Radio Network Temporary Identity (C-RNTI) can be used by the serving RAN for keep alive purposes. In another aspect, the mobile station can perform non-access stratum (NAS) signaling containing identification for the mobile station that is supported by underlying access stratum (AS) signaling via the serving RAN. This NAS signaling triggers the same MAC level identification of the mobile station at AS level. This detecting can be enhanced by having the intended recipient of the NAS signaling (e.g., Mobility Management Entity (MME) pass on this "keep-alive" transmission to the serving RAN. Should the mobile station need to send data while in this data idle state, the mobile station can avail itself of a Radio Resource Control (RRC) message that contains upper layer data, which the serving RAN also recognizes as a keep-alive transmission.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
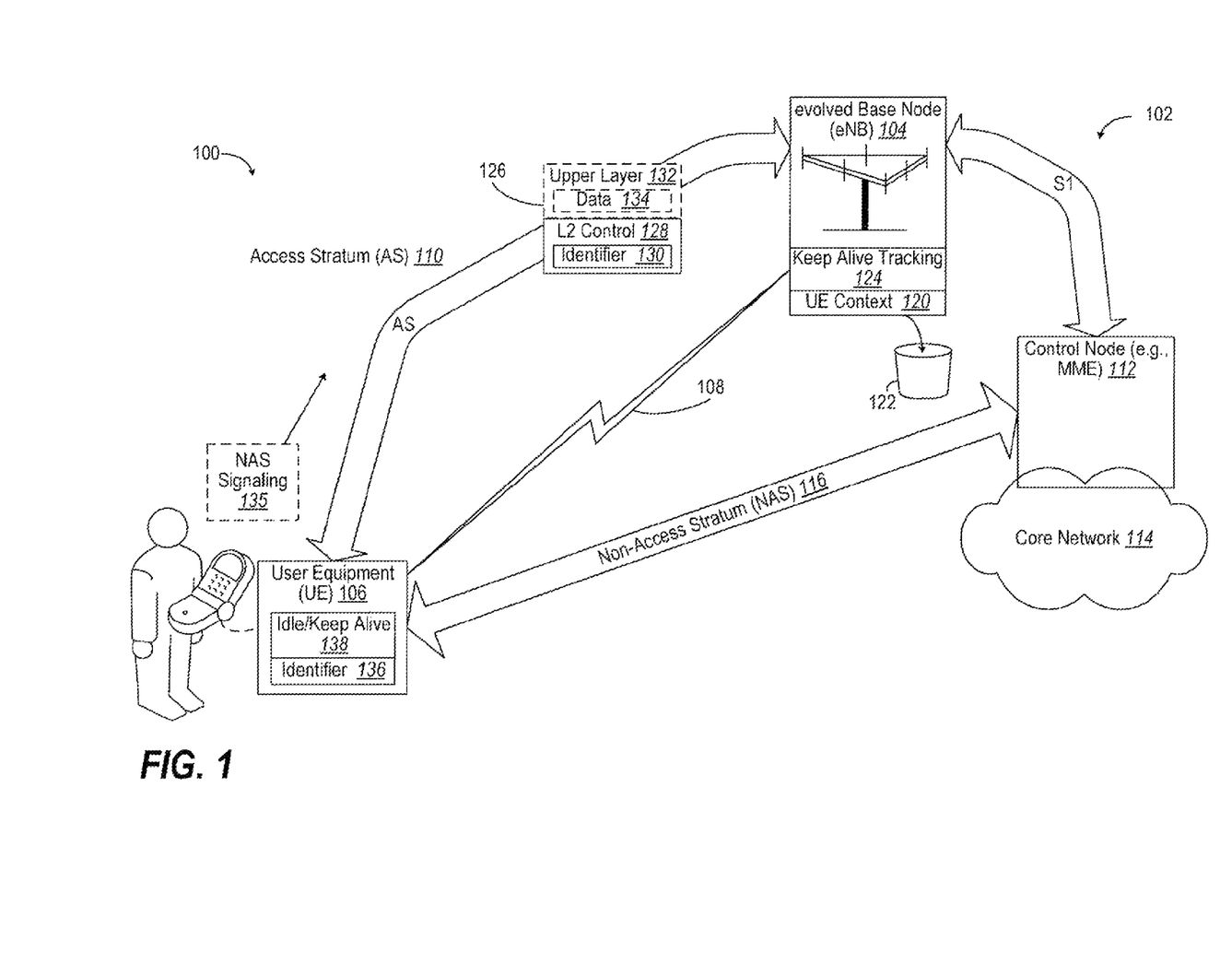
FIG. 1 depicts a block diagram of a wireless communication system in which an idle mobile station or user equipment (UE) can maintain state synchronization by transmitting on an uplink identifying signaling without necessarily accompanying data.

With reference to FIG. 1, a wireless communication system 100 in one aspect comprises an Evolved Universal Terrestrial Radio Access Network (E-UTRAN) 102 that performs two-way communication between a radio access network (RAN), depicted as an evolved Base Station (eNB) 104, with a mobile station, depicted as user equipment (UE) 106, via an over-the-air (OTA) link 108. Thereby, an access stratum (AS) 110 is supported between the UE 106 and the eNB 104, between the eNB 104 and other network control node in the core network, depicted as a Mobile Management Entity (MME) 112, to terminate at a core network 114. The access stratum 110 supports a transport of a non-access stratum 116 between the UE 106 and the MME 112 for interacting with the core network 114.

In an illustrative aspect, MME (Mobility Management Entity) 112 is a core network node interacting with the radio access network (RAN) 104. It is responsible for standby mode UE tracking and paging procedure including retransmissions. It is involved in the bearer activation/deactivation process and is also responsible for choosing the Serving Gateway (SGW) (not shown) for a UE 106 at the initial attach and at time of intra-LTE handover involving Core Network (CN) node relocation. It is responsible for authenticating the user (by interacting with a Home Subscriber Server (HSS)) (not shown). The Non-Access Stratum (NAS) signaling terminates at the MME 112. It checks the authorization of the UE 106 to camp on the service provider's Public Land Mobile Network (PLMN) (not shown) and enforces UE roaming restrictions. The MME 112 is the termination point in the network 102 for ciphering/integrity protection for NAS signaling and handles the security key management. Lawful interception of signaling is also supported by the MME 112. The MME 112 also provides the control plane function for mobility between LTE and 2G/3G access networks with the S3 interface terminating at the MME 112 from a Serving GPRS Support Node (SGSN) (not shown). The MME 112 also terminates the S6a interface towards the home HSS for roaming UEs 106.

The eNB 104 maintains UE context 120 for those UEs 106 within its coverage area at least for which the eNB 104 is the serving RAN. For processing and resource allocation efficiency, it is desirable that this context 120 accurately reflect those UEs 106 that are in a synchronized state with the eNB 104, with others discarded as depicted at 122. Advantageously, a keep alive tracking component 124 of the eNB 104 takes advantage of at least one form of identifying signaling 126 from the UE 106 that advantageously places less burden on the communication system 100 than is conventional. For instance, the identifying signaling 126 can comprise a Layer2 control channel 128 with an identifier 130 (e.g., C-RNTI) for the UE 106 that can be matched with the UE context 120. This identifying signaling 126 can omit in some or all instances a resource-consuming upper layer 132 carrying unnecessary data 134 sent for keep alive purposes. In another aspect, the identifying signaling 126 can comprise NAS signaling 135, which triggers the same Layer2 control channel 128 at AS signaling 110 that can be recognized by the eNB 104 for keep alive tracking component 124. The UE 106 supports the keep alive signaling by maintaining an identifier data structure 136 for the identifying signaling 126 and an idle/keep alive component 138 for extending battery service life and for performing the enhanced efficiency keep alive signaling.

In a WCDMA system, periodic Cell Update procedure is used as "keep-alive" signaling at Radio Access Network (RAN) level in RRC (Radio Resource Control) connected mode, as described in section 8.3.1 of TS25.331 "UTRA Radio Resource Control (RRC) Protocol specification". The signaling is used in "common channel" states where the uplink activity of User Equipment (UE) 106 can be completely halted unless there is data traffic generated. Similar state exists in E-UTRAN (Evolved Universal Mobile Telecommunications System Terrestrial Radio Access Network) since the UE can be placed in uplink non-synchronized mode (without a valid time advance) in connected mode. There must be a mechanism to ensure state synchronization between a RAN such as an evolved Base Node (eNB) and UE so that the eNB does not have to keep the UE context forever. Advantageous signaling options disclosed herein achieve the "keep-alive" function at RAN level.

Figure 2:
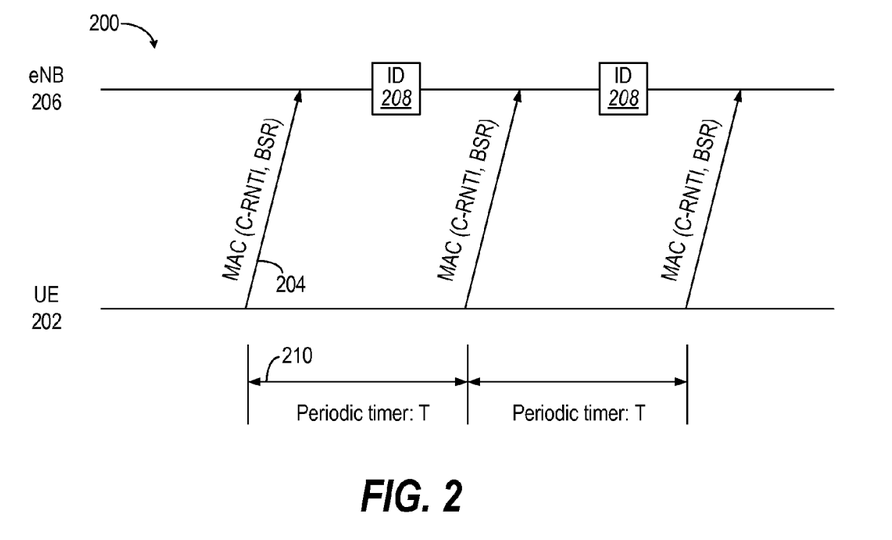
FIG. 2 depicts a timing diagram for a first option for MAC signaling based "keep-alive".

In one aspect depicted in FIG. 2, a first signaling option comprises a Medium Access Control (MAC) signaling based scheme or methodology 200. In particular, random access procedure (RACH) for uplink data arrival is used by UE 202, in which MAC buffer status report is transmitted periodically as depicted 204 to the network, depicted as eNB 206. This transmission indicates "0 byte" for buffer status. The eNB 206 can look at C-RNTI transmitted as MAC control element to identify the UE sending the "keep-alive" (block 208). The repetition can be based upon a recurring timer 'T' as depicted at 210.

Figure 3:
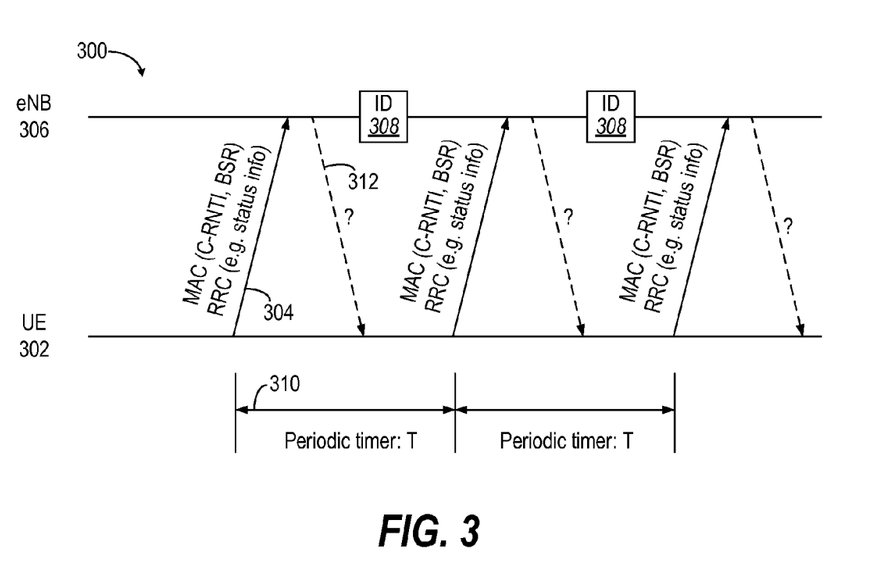
FIG. 3 depicts a timing diagram for a second option for RRC signaling based "keep-alive".

In another aspect in FIG. 3, a second signaling option comprises Radio Resource Control (RRC) signaling based scheme or methodology 300. In particular, a UE 302 uses an RRC message 304 (whether it is a new message or a reuse of existing message) is used to indicate "I am alive" to an eNB 306, which is identified (block 308). There can be an associated timer 310 that defines the periodicity of the signaling. It should be noted that for a WCDMA system the periodic Cell Update with the timer T305 is defined. In addition, this is an optimization on top of the MAC signaling solution since the uplink transmission of a RRC message indeed involves a random access procedure for uplink data arrival at MAC level. RRC signaling is enhanced in that there is other information that the UE would like to convey in addition to its identity, e.g., C-RNTI (Cell Radio Network Temporary Identity). A RRC response message in downlink may be needed if the RRC level synchronization on Access Stratum (AS) configurations or some status is considered essential as depicted at 312.

Figure 4:
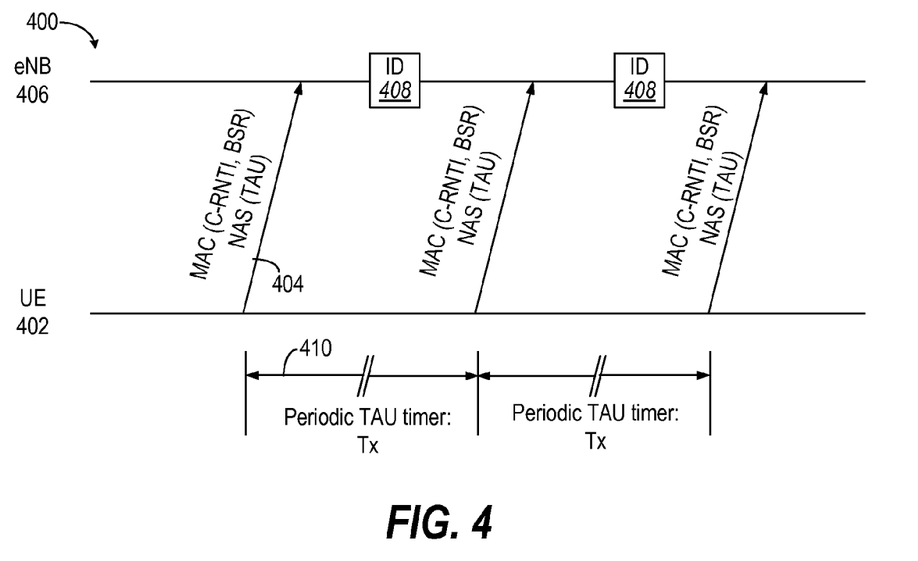
FIG. 4 depicts a timing diagram for a third option, first variant, for NAS signaling based "keep-alive".

In an additional aspect in FIG. 4, a third signaling option comprises Non-Access Stratum (NAS) signaling based scheme or methodology 400 for a UE 402 sending a reply 404 to eNB 406 on the NAS level "keep-alive" signaling (i.e., periodic Tracking Area Update (TAU)).

There are two variants in this NAS signaling based scheme. In a first variant depicted in FIG. 4, the eNB 406 captures the C-RNTI in MAC control element generated as a result of NAS message transmission (block 408). In this variant of the solution, the eNB 406 relies only on the MAC level information that is generated as a result of NAS Tracking Area Update signaling 404. So a difference from the first option (FIG. 2) effectively is that the periodicity is defined by a NAS timer 'Tx' 410 as opposed to an AS timer. Also, one layer violation aspect with this solution is that the eNB has to know the timer value for the NAS periodic Tracking Area Update.

Figure 5:
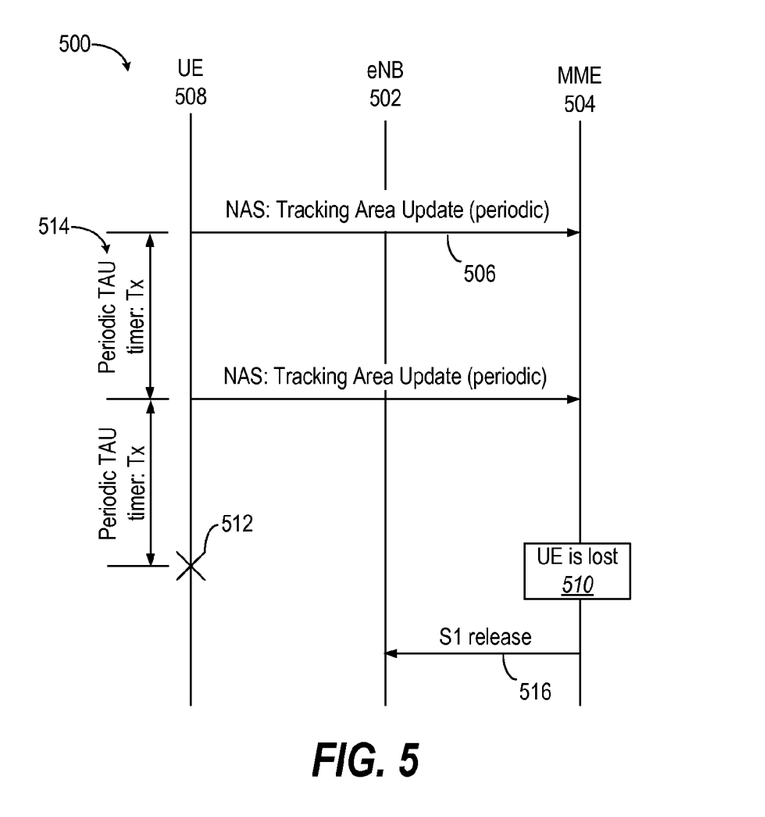
FIG. 5 depicts a timing diagram for a third option, second variant, for NAS signaling based "keep-alive".

In a second variant for the third option is depicted as a methodology 500 in FIG. 5, eNB 502 relies on an indication from MME (Mobility Management Entity) 504 over S1 interface. In this alternative variant, E-UTRAN does not implement any means to provide "keep-alive". That is, E-UTRAN completely relies on the NAS level "keep-alive", NAS periodic Tracking Area Update procedure 506 from a UE 508 to the MME 504 via the eNB 502. Once the MME 504 considers that the UE 508 is lost (block 510) from the network by absence of Tracking Area Update(s) as depicted at 512 as defined by timer 'Tx' 514, the S1 connection for the UE (and thus the UE content in RAN) is released as depicted at 516. Up to this point the eNB 502 considers the UE context is valid and keeps it.

Figure 6:
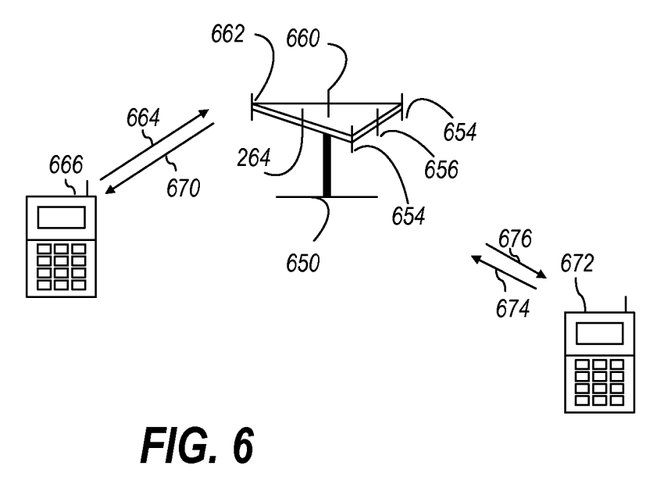
FIG. 6 depicts a block diagram of a multiple access wireless communication system according to one aspect.

Referring to FIG. 6, a multiple access wireless communication system according to one aspect is illustrated. An access point 650 (AP), which in the exemplary implementation can be an evolved Base Node (eNB), includes multiple antenna groups, one including 654 and 656, another including 658 and 660, and an additional including 662 and 664. In FIG. 4, only two antennas are shown for each antenna group, however, more or fewer antennas may be utilized for each antenna group. Access terminal (AT) 666, also referred to as user equipment (UE), is in communication with antennas 662 and 664, where antennas 662 and 664 transmit information to access terminal 666 over forward link 670 and receive information from access terminal 666 over reverse link 668.

Access terminal 672 is in communication with antennas 656 and 658, where antennas 656 and 658 transmit information to access terminal 672 over forward link 676 and receive information from access terminal 672 over reverse link 674. In a FDD system, communication links 668, 670, 674 and 676 may use different frequency for communication. For example, forward link 670 may use a different frequency then that used by reverse link 668. Each group of antennas and/or the area in which they are designed to communicate is often referred to as a sector of the access point 650. In the aspect, antenna groups each are designed to communicate to access terminals 666, 672 in a sector of the areas covered by access point 650.

In communication over forward links 670 and 676, the transmitting antennas of access point 650 utilize beamforming in order to improve the signal-to-noise ratio of forward links for the different access terminals 666 and 674. Also, an access point using beamforming to transmit to access terminals scattered randomly through its coverage causes less interference to access terminals in neighboring cells than an access point transmitting through a single antenna to all its access terminals.

An access point 650 may be a fixed station used for communicating with the terminals and may also be referred to as an access point, a Node B, or some other terminology. An access terminal 666, 672 may also be called user equipment (UE), a wireless communication device, terminal, access terminal or some other terminology.

Figure 7:
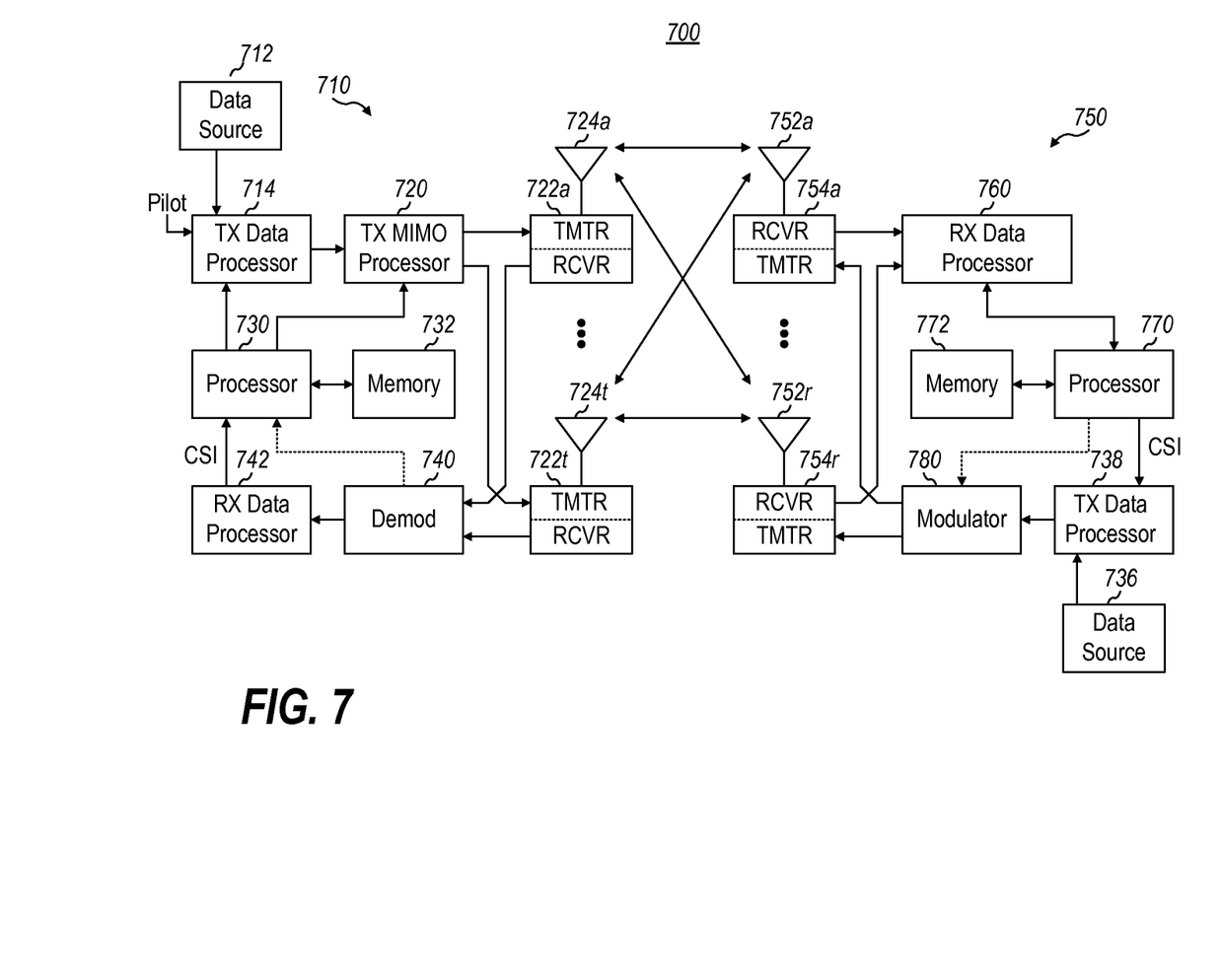
FIG. 7 depicts a block diagram of a communication system according to one aspect.

FIG. 7 is a block diagram of an aspect of a transmitter system 710 (also known as the access point) and a receiver system 770 (also known as access terminal) in a MIMO system 700. At the transmitter system 710, traffic data for a number of data streams is provided from a data source 712 to a transmit (TX) data processor 714.

In an aspect, each data stream is transmitted over a respective transmit antenna. TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 730.

The modulation symbols for all data streams are then provided to a TX MIMO processor 720, which may further process the modulation symbols (e.g., for OFDM). TX MIMO processor 720 then provides $N_T$ modulation symbol streams to $N_T$ transmitters (TMTR) 722a through 722t. In certain implementations, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 722a through 722t are then transmitted from $N_T$ antennas 724a through 724t, respectively.

At receiver system 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ receivers 754 based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710.

A processor 770 periodically determines which pre-coding matrix to use (discussed below). Processor 770 formulates a reverse link message comprising a matrix index portion and a rank value portion.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by transmitters 754a through 754r, and transmitted back to transmitter system 710.

At transmitter system 710, the modulated signals from receiver system 750 are received by antennas 724, conditioned by receivers 722, demodulated by a demodulator 740, and processed by a RX data processor 742 to extract the reserve link message transmitted by the receiver system 750. Processor 730 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

In an aspect, a channel structure is provided that preserves low PAR (at any given time, the channel is contiguous or uniformly spaced in frequency) properties of a single carrier waveform.

For the purposes of the present document, the following abbreviations apply:

| | |
|---|---|
| 3GPP | Third Generation Partnership Project |
| AIS | Automatic Identification System |
| AM | Acknowledged Mode |
| AMD | Acknowledged Mode Data |
| ARQ | Automatic Repeat Request |
| AS | Access Stratum |
| BCCH | Broadcast Control CHannel |
| BCH | Broadcast CHannel |
| BLER | Block Error Rate |
| C- | Control- |
| CCCH | Common Control CHannel |
| CCH | Control CHannel |
| CCTrCH | Coded Composite Transport Channel |
| CDI | Channel Direction Information |
| C-RNTI | Cell Radio Network Temporary Identity |
| CP | Cyclic Prefix |
| CRC | Cyclic Redundancy Check |
| CTCH | Common Traffic CHannel |
| DCCH | Dedicated Control CHannel |
| DCH | Dedicated CHannel |
| DL | DownLink |
| DL-SCH | Downlink Shared CHannel |
| DSCH | Downlink Shared CHannel |
| DTCH | Dedicated Traffic Channel |
| eNB | evolved Base Node |
| E-UTRAN | Evolved Universal Mobile Telecommunications System Terrestrial Radio Access Network |
| FACH | Forward link Access CHannel |
| FDD | Frequency Division Duplex |
| FSTD | Frequency Switching Transmit Diversity |
| FTSTD | Frequency Time Switching Transmit Diversity |
| HFN | Hyper Frame Number |
| i.i.d. | independent and identically distributed |
| L1 | Layer 1 (physical layer) |
| L2 | Layer 2 (data link layer) |
| L3 | Layer 3 (network layer) |
| LI | Length Indicator |
| LSB | Least Significant Bit |
| LTE | Long Term Evolution |
| MAC | Medium Access Control |
| MBMS | Multimedia Broadcast Multicast Service |
| MBSFN | Multicast Broadcast Single Frequency Network |
| MCCH | MBMS point-to-multipoint Control Channel |
| MCE | MBMS Coordinating Entity |
| MCH | Multicast CHannel |
| MIMO | Multiple Input Multiple Output |
| MME | Mobility Management Entity |
| MRW | Move Receiving Window |
| MSB | Most Significant Bit |
| MSCH | MBMS point-to-multipoint Scheduling CHannel |
| MTCH | MBMS point-to-multipoint Traffic Channel |
| NAS | Non-Access Stratum |
| OFDM | Orthogonal Frequency Division Multiplex |
| PBCH | Physical Broadcast CHannel |

-continued

| | |
|---|---|
| PCCH | Paging Control CHannel |
| PCH | Paging CHannel |
| PDCCH | Physical Downlink Control Channel |
| PDSCH | Physical Downlink Shared Channel PDU Protocol Data Unit |
| PFSTD | Precoded Frequency Switching Transmit Diversity |
| PHY | PHYsical layer |
| PhyCH | Physical Channels |
| PSC | Primary Synchronization Channel |
| PUSCH | Physical Uplink Shared Channel |
| PUCCH | Physical Uplink Control Channel |
| PVS | Precoding Vector Switch |
| QoS | Quality of Service |
| RACH | Random Access Channel |
| RAN | Radio Access Network |
| RLC | Radio Link Control |
| RRC | Radio Resource Control |
| RS | Received Signal |
| RX | Receive |
| SCH | Synchronization CHannel |
| SAP | Service Access Point |
| SFBC | Space-Frequency Block-Code |
| SSC | Secondary Synchronization Channel |
| SDU | Service Data Unit |
| SHCCH | SHared channel Control CHannel |
| SN | Sequence Number |
| SUFI | SUper FIeld |
| TCH | Traffic CHannel |
| TDD | Time Division Duplex |
| TFI | Transport Format Indicator |
| TM | Transparent Mode |
| TMD | Transparent Mode Data |
| TTI | Transmission Time Interval |
| TX | Transmit |
| U- | User- |
| UE | User Equipment |
| UL | UpLink |
| UM | Unacknowledged Mode |
| UMB | Ultra Mobile Broadband |
| UMD | Unacknowledged Mode Data |
| UMTS | Universal Mobile Telecommunications System |
| UTRA | UMTS Terrestrial Radio Access |
| UTRAN | UMTS Terrestrial Radio Access Network |
| VTSTD | Virtual Time Switching Transmit Diversity |
| WCDMA | Wideband Code Division Multiple Access |
| WWAN | Wireless Wide Area Network |

Figure 8:
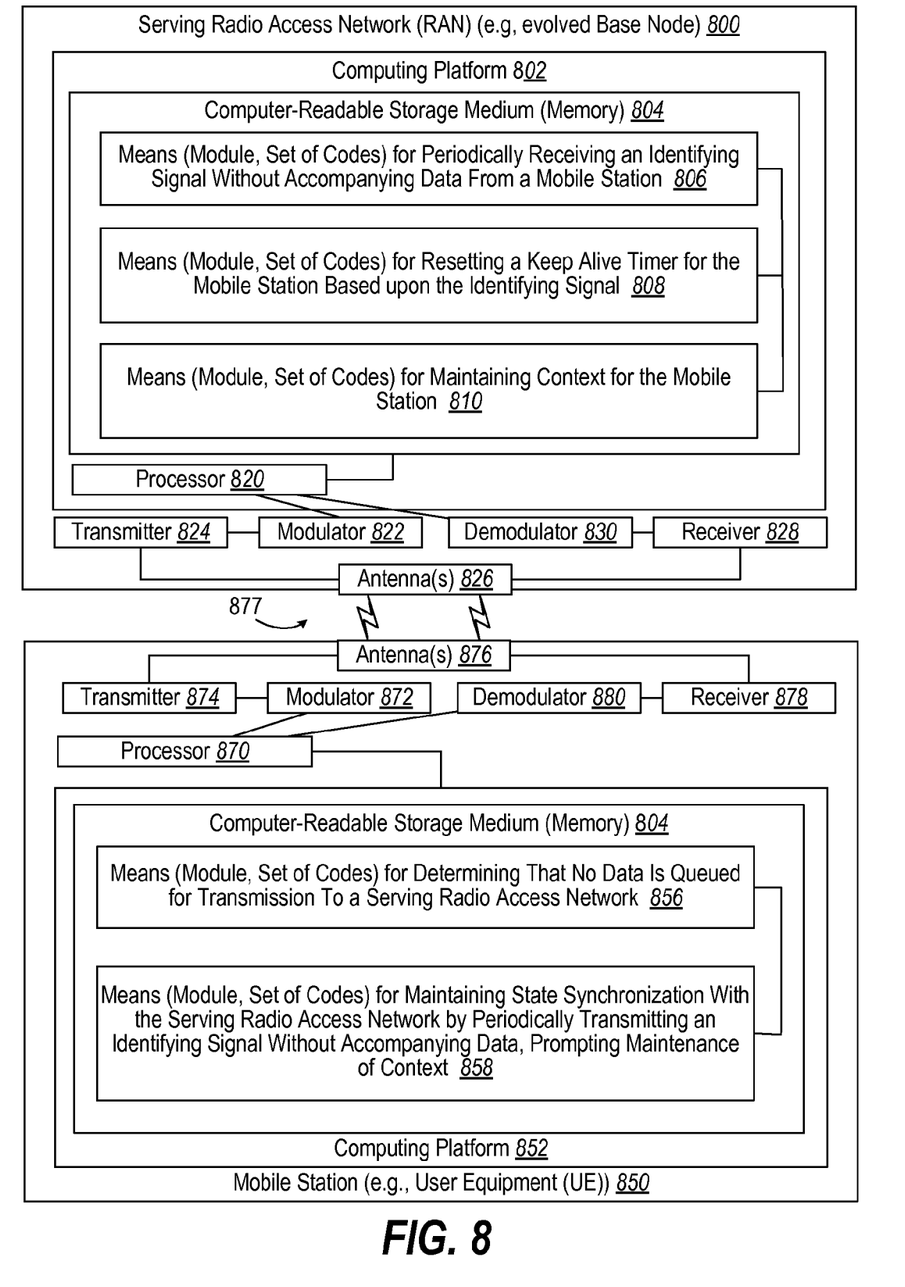
FIG. 8 depicts a block diagram of computing platforms for an evolved base node (eNB) and user equipment (UE) performing keep alive identifying signaling.

In FIG. 8, a serving radio access network (RAN), depicted as an evolved base node (eNB) 800, has a computing platform 802 that provides means such as sets of codes for causing a computer for receiving keep alive signaling from mobile station. In particular, the computing platform 802 includes a computer readable storage medium (e.g., memory) 804 that stores a plurality of modules 806-810 executed by a processor(s) 820. A modulator 822 controlled by the processor 820 prepares a downlink signal for modulation by a transmitter 824, radiated by antenna(s) 826. A receiver 828 receives uplink signals from the antenna(s) 826 that are demodulated by a demodulator 828 and provided to the processor 820 for decoding. In particular, a means (e.g., module, set of codes) 806 is provided for periodically receiving an identifying signal without accompanying data from a mobile station. A means (e.g., module, set of codes) 808 is provided for resetting a keep alive timer for the mobile station based upon the identifying signal. A means (e.g., module, set of codes) 810 is provided for maintaining context for the mobile station.

With continued reference to FIG. 8, a mobile station, depicted as user equipment (UE) 850, has a computing platform 852 that provides means such as sets of codes for causing a computer or keep alive signaling to a radio access network (RAN). In particular, the computing platform 852 includes a computer readable storage medium (e.g., memory) 854 that stores a plurality of modules 856-858 executed by a processor(s) 870. A modulator 872 controlled by the processor 870 prepares an uplink signal for modulation by a transmitter 874, radiated by antenna(s) 876 as depicted at 877 to the eNB 800. A receiver 878 receives downlink signals from the eNB 800 from the antenna(s) 876 that are demodulated by a demodulator 878 and provided to the processor 870 for decoding. In particular, a means (e.g., module, set of codes) 856 is for determining that no data is queued for transmission to a serving radio access network. Means (e.g., module, set of codes) 858 are provided for maintaining state synchronization with the serving radio access network by periodically transmitting an identifying signal without accompanying data, prompting maintenance of context.

Figure 9:
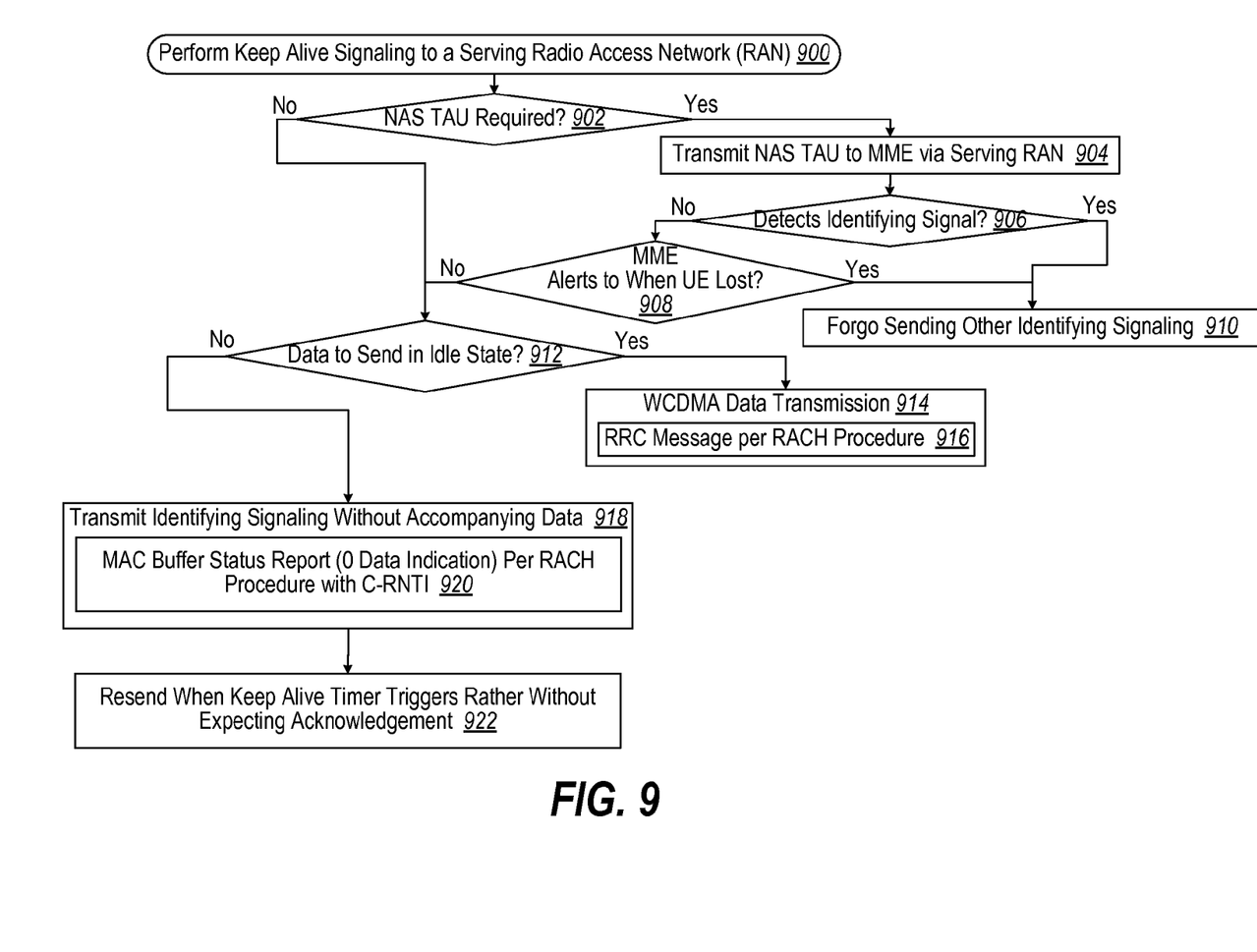
FIG. 9 depicts a flow diagram of a methodology or sequence of operations for a mobile station or UE to perform keep alive signaling to a radio access network (RAN).

In FIG. 9, a methodology 900 or sequence of operations is provided for a mobile station or ULE to perform keep alive signaling to a radio access network (RAN). In one aspect, the UE can select from a plurality of schemes for keep alive signaling. A determination is made as to whether the UE is operating within a communication system that requires tracking area updates (TAU) to made on a non-access stratum (NAS) to a network entity such as mobility management entity (MME) (block 902). If so, then the UE transmits the NAS TAU periodically in accordance with a TAU timer to the MME via a serving radio access network (RAN) (block 904). The UE can forgo identifying signaling to the serving RAN (e.g., eNB), if the serving RAN can detect the identifying context from the MAC content attached to the NAS TAU (block 906) or if the serving RAN maintains context until notified by the MME that the UE is lost (block 908), then the UE can forgo other identifying signaling for keep alive purposes as depicted at 910. Alternatively or in addition, if at block 902 it is determined that NAS TAU is not required, then a further determination can be made that data can be advantageously sent to the serving RAN even though the UE is in an data idle state (block 912). If so, the data can be transmitted on an uplink by performing E-UTRAN protocol (block 914). In particular, this transmission can be a transmitting a radio resource control (RRC) message utilizing random access channel (RACH) procedure (block 916). Alternatively or in addition, if no NAS TAU is to be sent in block 902 nor if there is no need to send data as in block 912, then identifying signaling without accompanying data is made for keep alive purposes (block 918). In another aspect, this identifying signaling comprises medium access control (MAC) buffer status report by random access procedure (RACH) that indicates zero byte data and identifying Cell Radio Network Temporary Identity (C-RNTI) (block 920). By not having to send data for keep alive purposes, this idle/keep alive approach can be repeated without having to receive an acknowledgement from the serving radio access network, as depicted at 922.

Figure 10:
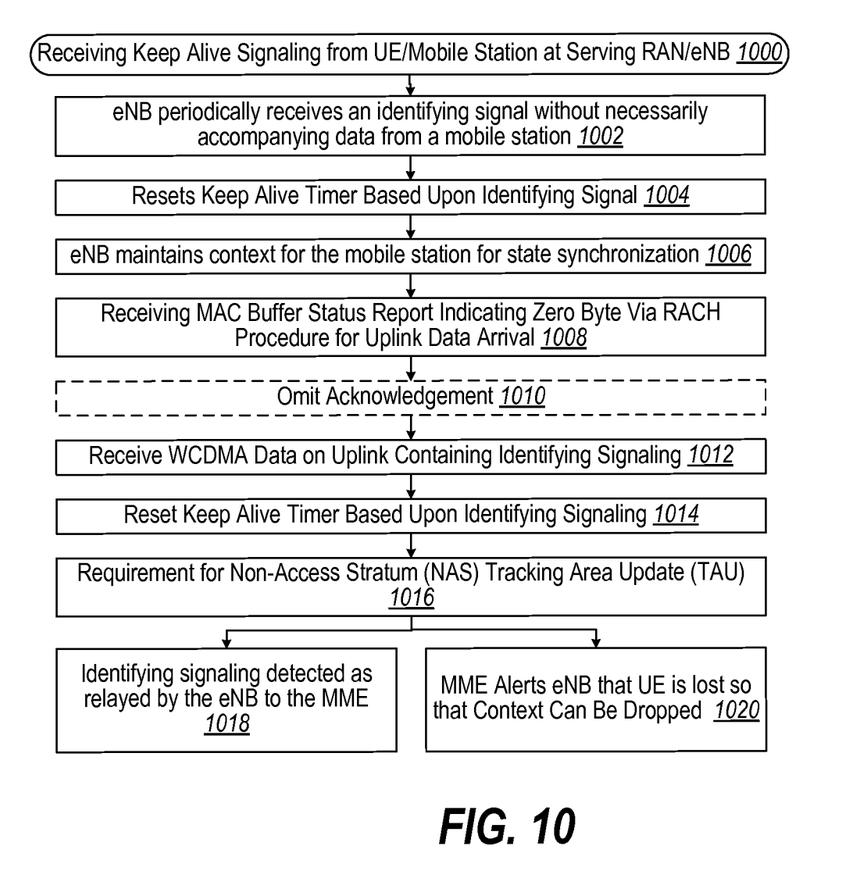
FIG. 10 depicts a flow diagram of a methodology or sequence of operations for receiving keep alive signaling from mobile station at a radio access network (RAN).

In FIG. 10, a methodology 1000 or sequence of operations is depicted for receiving keep alive signaling from mobile station at a radio access network (RAN). The eNB periodically receives an identifying signal without necessarily accompanying data from a mobile station (block 1002). The eNB responds by resetting a keep alive timer for the mobile station based upon the identifying signal (block 1004). Thereby the eNB maintains context for the mobile station for state synchronization (block 1006). In an illustrative aspect, this identifying signaling comprises receiving a MAC buffer status report indicating zero byte using random access procedure for uplink data arrival (block 1008). The eNB can omit acknowledging receipt of the identifying signaling, as depicted at 1010. Alternatively or in addition, in one aspect, the serving RAN or eNB can receive identifying signaling that is accompanied with signaling data from the mobile station or UE by decoding E-UTRAN protocol (block 1012). The eNB resets the keep alive timer for the mobile station based upon determining identification of the mobile station from the received E-UTRAN signaling data (block 1014). Alternatively or in addition, the eNB can benefit from a requirement for the UE to send an NAS TAU (block 1016). The identifying signaling can be detected as relayed by the eNB to the MME (block 1018) or the eNB maintain context until the MME alerts the eNB that the UE has stopped sending NAS TAU (block 1020).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for communicating with a radio access network, the method comprising:
   determining that no data is queued at a first device for transmission to the radio access network; and
   transmitting to the radio access network, based on determining that no data is queued, an identifying signal that causes the radio access network to maintain context of the first device at the radio access network, wherein no acknowledgement is received from the radio access network during the communicating.

2. The method of claim 1, further comprising:
   determining that data is queued for transmission to the radio access network; and
   transmitting the data based on the Evolved Universal Mobile Telecommunications System Terrestrial Radio Access Network (E-UTRAN) protocol.

3. The method of claim 2, further comprising transmitting a radio resource control message, prompting reset of a timer by the radio access network.

4. The method of claim 1, wherein the identifying signal comprises a medium access control buffer status report including a cell radio network temporary identity.

5. The method of claim 1, further comprising transmitting an access stratum transmission to the radio access network supporting a non-access stratum layer comprising the identifying signal.

6. The method of claim 5, further comprising transmitting the non-access stratum layer signaling by transmitting a periodic tracking area update.

7. The method of claim 5, further comprising transmitting the non-access stratum layer signaling that triggers a medium access control buffer status report for the radio access network to detect the identifying signal.

8. The method of claim 5, further comprising transmitting the non-access stratum layer signaling that triggers a medium access control buffer status report for the radio access network to receive the identifying signal from a downstream recipient.

9. The method of claim 1, further comprising selecting one of a plurality of options for transmitting the identifying signal, the plurality of options comprising,
   transmitting a non-access stratum periodic tracking area update with mobile station identification to a mobility management entity via the radio access network in response to a determination of a reporting requirement;

transmitting medium access control message in response to a determination that data is to be transmitted on an uplink to the radio access network; and transmitting a medium access control buffer status report for uplink data arrival in response to a determination of no data queued for uplink transmission.

10. The method of claim 1, further comprising periodically transmitting the identifying signal based upon a timer.

11. At least one processor for communicating with a radio access network, the at least one processor comprising: a first module for determining that no data is queued for transmission to the radio access network; and a second module for transmitting to the radio access network, based on determining that no data is queued, an identifying signal that causes the radio access network to maintain context at the radio access network, wherein no acknowledgement is received from the radio access network during the communicating.

12. A computer program product for communicating with a radio access network, the computer program product comprising:

a non-transitory computer-readable medium comprising, a first set of codes for causing a computer to determine that no data is queued at a first device for transmission to the radio access network; and a second set of codes for causing the computer to transmit to the radio access network, based on determining that no data is queued, an identifying signal that causes the radio access network to maintain context of the first device at the radio access network, wherein no acknowledgement is received from the radio access network during the communicating.

13. An apparatus for communicating with a radio access network, the apparatus comprising:

means for determining that no data is queued for transmission to the radio access network; and means for transmitting to the radio access network, based on determining that no data is queued, an identifying signal that causes the radio access network to maintain context at the radio access network, wherein no acknowledgement is received from the radio access network during the communicating.

14. An apparatus for communicating with a radio access network, the apparatus comprising:

a computing platform for determining that no data is queued for transmission to the radio access network; and a transmitter for transmitting to the radio access network, based on determining that no data is queued, an identifying signal that causes the radio access network to maintain context at the radio access network, wherein no acknowledgement is received from the radio access network during the communicating.

15. The apparatus of claim 14, wherein the computing platform is further for determining that data is queued for transmission to the radio access network, and wherein the transmitter is further for transmitting the data.

16. The apparatus of claim 15, wherein the transmitter is further for transmitting a radio resource control message, prompting reset of a timer by the radio access network.

17. The apparatus of claim 14, wherein the identifying signal comprises a medium access control buffer status report including a cell radio network temporary identity.

18. The apparatus of claim 14, wherein the transmitter is further for transmitting an access stratum transmission to the radio access network supporting a non-access stratum layer comprising the identifying signal.

19. The apparatus of claim 18, wherein the transmitter is further for transmitting the non-access stratum layer signaling by transmitting a periodic tracking area update.

20. The apparatus of claim 18, wherein the transmitter is further for transmitting the non-access stratum layer signaling that triggers a medium access control buffer status report for the radio access network to detect the identifying signal.

21. The apparatus of claim 18, wherein the transmitter is further for transmitting the non-access stratum layer signaling that triggers a medium access control buffer status report for the radio access network to receive the identifying signal from a downstream recipient.

22. The apparatus of claim 14, wherein the computing platform is further for selecting one of a plurality of options for transmitting the identifying signal, the plurality of options comprising, transmitting a non-access stratum periodic tracking area update with mobile station identification to a mobility management entity via the radio access network in response to a determination of a reporting requirement;

transmitting medium access control message in response to a determination that data is to be transmitted on an uplink to the radio access network; and transmitting a medium access control buffer status report for uplink data arrival in response to a determination of no data queued for uplink transmission.

23. The apparatus of claim 14, wherein the transmitter is further for periodically transmitting the identifying signal based upon a timer.

* * * * *